April 6, 1926.

A. E. ANDERSON 1,579,745

CONTROL MECHANISM FOR ELECTRIC SWITCHES

Filed Sept. 22, 1923      6 Sheets-Sheet 1

Fig. 1.

Inventor:
Alf E. Anderson
By Jas. H. Churchill
Atty.

April 6, 1926.

A. E. ANDERSON

1,579,745

CONTROL MECHANISM FOR ELECTRIC SWITCHES

Filed Sept. 22, 1923 6 Sheets-Sheet 2

Inventor
Alf E. Anderson
by Jas. H. Churchill
atty.

April 6, 1926.  1,579,745
A. E. ANDERSON
CONTROL MECHANISM FOR ELECTRIC SWITCHES
Filed Sept. 22, 1923   6 Sheets-Sheet 4

April 6, 1926.

A. E. ANDERSON 1,579,745

CONTROL MECHANISM FOR ELECTRIC SWITCHES

Filed Sept. 22, 1923   6 Sheets-Sheet 6

Inventor
Alf E. Anderson
by Jas. H. Churchill
Atty.

Patented Apr. 6, 1926.

1,579,745

UNITED STATES PATENT OFFICE.

ALF E. ANDERSON, OF MILTON, MASSACHUSETTS, ASSIGNOR TO ALBERT & J. M. ANDERSON MANUFACTURING COMPANY, OF BOSTON, MASSACHUSETTS, A CORPORATION OF MASSACHUSETTS.

CONTROL MECHANISM FOR ELECTRIC SWITCHES.

Application filed September 22, 1923. Serial No. 664,146.

*To all whom it may concern:*

Be it known that I, ALF E. ANDERSON, a citizen of the United States, residing in Milton, in the county of Norfolk and State of Massachusetts, have invented an Improvement in Control Mechanism for Electric Switches, of which the following description, in connection with the accompanying drawings, is a specification, like characters on the drawings representing like parts.

This invention has for its object to provide a control mechanism for a plurality of switches governing a plurality of circuits, whereby one or more switches is or are locked in one position when one or more of the other switches is or are unlocked and in a different position.

The invention is especially adapted for use with switches governing a plurality of electric circuits and particularly three or more circuits, so that the said switches are required to be operated in a predetermined order, and whereby a selected one of said switches is capable of being operated freely at the will of the operator.

The control mechanism may and preferably will be constructed so as to require the selected switch after being moved from one position to another, to be returned to the first mentioned position in order that the other switches of the series may be moved from the positions they occupy.

In the present instance one embodiment of the invention is shown, wherein each switch is of the type known as a double throw switch and is provided with a movable member with which the control mechanism cooperates. The movable member may be a single blade or as in the present case, may be provided with two blades connected together to move as one piece but arranged with relation to each other and to their cooperating terminals so that when one blade is in its closed position the other blade will be in its open position. For sake of distinction, one blade and its cooperating contact will be hereinafter designated the upper switch and the other blade and its cooperating contact the lower switch, and said switches are constructed and arranged so that when an upper switch is opened, its companion lower switch is closed and vice versa.

In many cases of electrical distribution or work, it is desirable that a series of switches controlling independent sources of power, as for instance, large storage batteries, should be opened and closed in a predetermined order or sequence in order to avoid serious accidents with attendant damage, and yet leave one of the said switches free to be opened and closed at the will of the operator.

This result may be accomplished with the present invention, as will be more fully pointed out hereafter. These and other features of the invention will be pointed out in the claims at the end of this specification.

Figure 1:
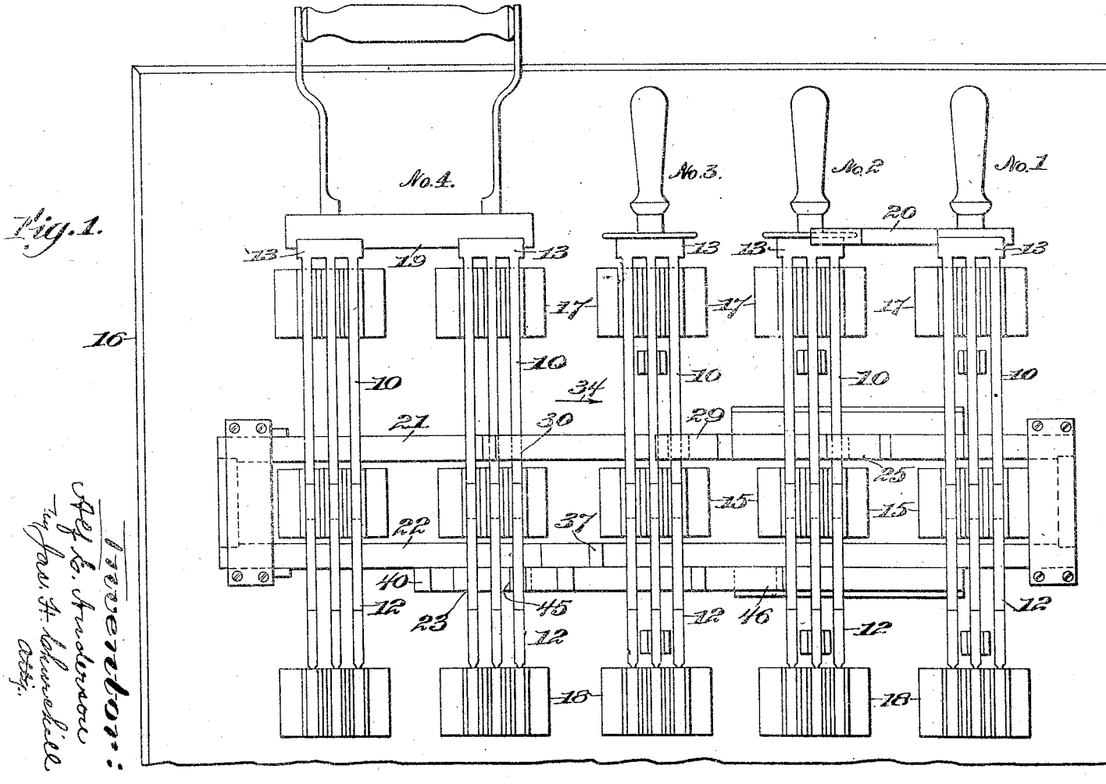
Fig. 1 represents a series or plurality of electric switches, three of which are controlled in accordance with this invention.

In the present instance, the invention is shown as embodied in one form of switch mechanism of known construction and comprising a series of four upper and four lower switches marked No. 1, No. 2, No. 3 and No. 4, in Fig. 1.

The movable member of each switch herein shown comprises an upper blade 10, and a lower blade 12 arranged at an angle to the blade 10, so that when the upper blade 10 is in its closed position, the lower blade 12 will be in its open position, and vice versa. In the present instance, each blade 10 is in its closed position, the lower blade 12 will be in its open position, and vice versa. In the present instance, each blade comprises three upper and lower members connected at their upper end by a head or cross bar 13, and said blade is pivotally mounted at 14 on a stationary contact member 15 secured to a panel or board 16 of insulating material. The upper blade 10 cooperates with a stationary contact member 17, and the lower blade 12 cooperates with a stationary contact member 18. The contact members 17, 18 are secured to the panel or board 16. The contact members 15, 17 constitute terminals of an electric circuit, not shown, but which is controlled by the upper blade member 10 cooperating with said terminals.

The contact members 15, 18 constitute terminals of an independent electric circuit, not shown, but which is controlled by the lower blade 12 cooperating with said terminals. The other switches are of like construction, and in the present instance, No. 4 switch is shown as a double switch in which two blades are connected by a cross bar 19 to operate as one piece.

Provision is made for controlling a plurality of the switches so that they are capable of being opened and closed in predetermined order or sequence, and be locked against movement other than in sequence, except in the case of a selected switch of the series.

To this end, mechanism for interlocking a plurality of the switches, is provided, and in the present instance, is shown one form or construction of locking mechanism, which cooperates with three of the four switches, to wit, with switches Nos. 2, 3 and 4.

In the present instance, switch No. 1 is free to be opened and closed at the will of the operator. It is provided with an arm 20, see Fig. 1, which extends into the path of movement of the upper blade 10 of switch No. 2, and prevents switch No. 2 being opened, until switch No. 1 has been opened. This particular arrangement of switch Nos. 1 and 2 is not herein claimed.

Switches Nos. 2, 3 and 4 are interlocked and controlled in accordance with the present invention.

The interlocking mechanism herein shown, consists of three members which cooperate with the movable blades of switches Nos. 2, 3 and 4.

In the present instance, the three locking members are shown as bars 21, 22, 23, which are mounted on the board 16 to slide laterally with relation to the blades of switches Nos. 2, 3 and 4.

The three bars 21, 22, 23 are shown separately in Figs. 8 to 13 inclusive and also associated together in Figs. 15 to 18 inclusive. The bar 21 cooperates with the upper blade 10 of switches Nos. 2, 3 and 4. The bars 22, 23 cooperate with the lower blades 12 of switches Nos. 2, 3 and 4.

Figures 2, 3, 4:
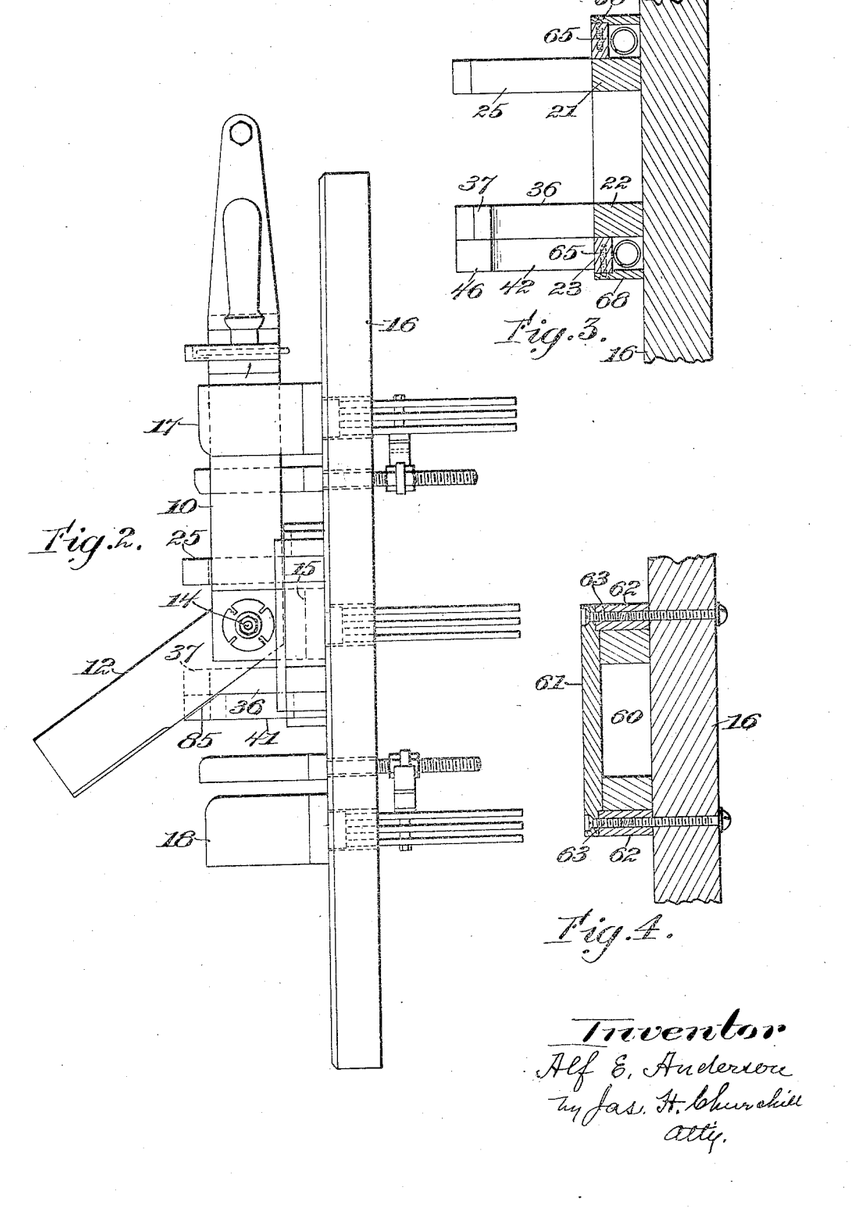
Fig. 2 is a side elevation of the switches shown in Fig. 1 looking toward the left.
Fig. 3, a section taken on the line 3—3, Fig. 5.
Fig. 4, a section on the line 4—4, Fig. 5.

The bar 21 is provided with three arms 25, 26, 27, which are spaced apart, so as to cooperate respectively with the upper blades of switches Nos. 2, 3 and 4. The arm 25 is provided with an inclined or cam surface 28, and the arms 26, 27 are provided with laterally extended fingers 29, 30 of unequal length. The fingers 29, 30 are provided with inclined or cam surfaces 31, 32 respectively. In the present instance the finger 30 is made twice as long as the finger 29. When the upper switches Nos. 2, 3 and 4 are closed, as represented in Figs. 1 and 2, the finger 30 overlaps the upper blade 10 of switch No. 4 to such extent as to require movement of the bar 21 two steps in the direction indicated by the arrow 34 in order to unlock the switch No. 4.

The finger 29 overlaps the upper blade 10 of switch No. 3 to such extent as to require movement of the bar 21 only one step in order to unlock the switch No. 3.

The arm 25 has its cam surface 28 positioned in line with the upper blade 10 of switch No. 2 and the latter switch is capable of being opened. This arrangement of the locking bar 21 with relation to the upper blade 10 of switches 2, 3 and 4 is shown diagrammatically in Fig. 15, and by reference thereto, it will be seen, that if the upper blade 10 of switch No. 2 is opened, the said blade, acting on the cam surface 28 of arm 25, will move the bar 21 one step to the right and into the position shown in Fig. 16.

Figure 16:
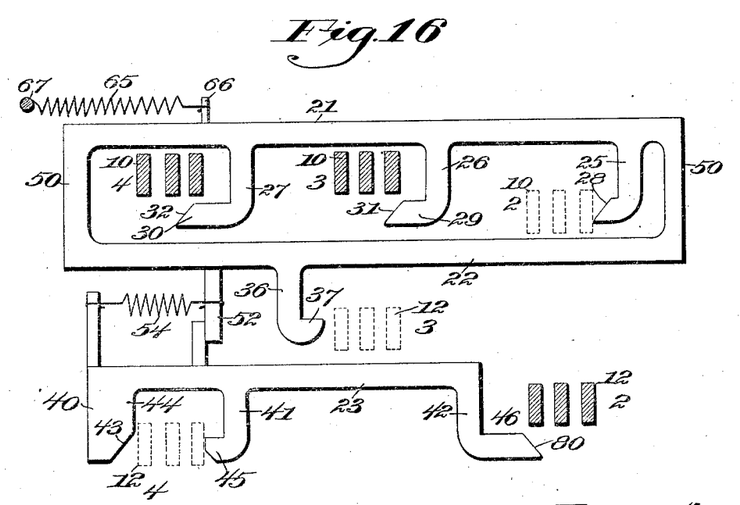

When the bar 21 is moved into the position shown in Fig. 16, the finger 29 unlocks the upper blade 10 of switch No. 3 and its cam surface 31 is positioned in the path of the said blade and the latter is capable of being opened. It will also be seen that the finger 30 still locks the upper blade 10 of switch No. 4.

Figure 17:
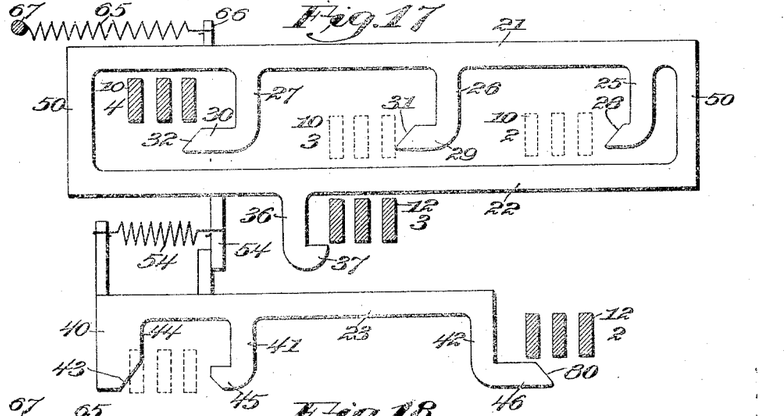

Upper No. 3 switch can now be opened, and in opening the same, its blade 10 acts on the cam surface 31 of the finger 29 and moves the bar 21 a second step to the right into position shown in Fig. 17, which unlocks upper blade 10 of switch No. 4, and the latter is capable of being opened. When upper switch No. 4 is opened, its blade 10 acts on the cam surface 32 of finger 30 and moves the bar 21 a third step to the right and into the position shown in Fig. 18, in which position the bar 21 is held by the upper blade 10 of switch No. 4 in the open position of said blade, as will be described.

It will thus be seen that the upper switches Nos. 2, 3 and 4 have been opened in sequence, and if desired, they may be immediately closed in sequence in the reverse order to that in which they have been opened, and if closed in sequence, the bar 21 is moved step by step in the reverse direction, as will be described, so that when the upper switches are closed in the order 4, 3, 2, the locking bar 21 will be brought back into the position shown in Figs. 1 and 15, with switches Nos. 4 and 3 locked and No. 2 unlocked.

As previously stated, bars 22 and 23 cooperate with the blades 12 of lower switches Nos. 2, 3 and 4.

The bar 22 is provided with a single arm 36 having a locking finger 37, which cooperates with the blade 12 of lower switch No. 3 to lock the latter.

Figure 15:
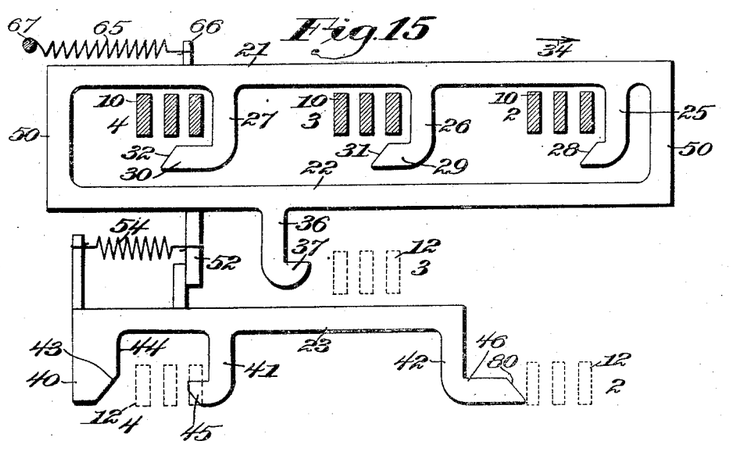

The bar 22 is connected with the bar 21 so as to move with the latter as one piece, and the arm 36 is arranged on the bar 22 so that when the upper switches are in their closed position the arm 36 on the bar 22 will be removed from the path of the blade 12 of lower switch No. 3, the distance of three steps as represented in Fig. 15.

By reference to Figs. 15 to 18, it will be seen that when the upper switch No. 2 is opened, and lower switch No. 2 is closed, the bars 21, 22 are respectively moved one step from the positions shown in Fig. 15 into the positions shown in Fig. 16.

In these positions of the bars 21, 22 upper switch No. 3 can be opened and lower switch No. 3 can be closed.

When upper switch No. 3 is opened, the bars 21, 22 are respectively moved a second step into the positions shown in Fig. 17, and lower switch No. 3 is closed.

Figure 18:
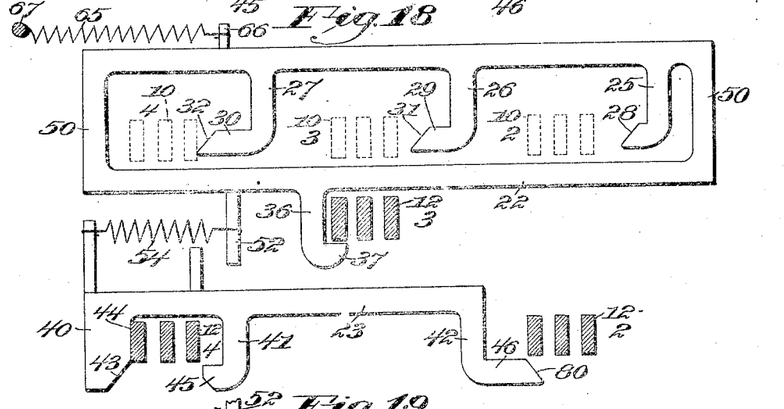

When upper switch No. 4 is opened, the bars 21, 22 are respectively moved a third step into the positions shown in Fig. 18 and lower switch No. 4 is closed and lower switch No. 3 is locked by the finger 37 on bar 22, as represented in Fig. 18.

It will thus be seen, that when the upper switches are opened and the lower switches are closed, the locking finger 37 overlaps the blade 12 of lower switch No. 3 and locks the latter in its closed position and upper switch No. 3 in its open position.

The bar 23 is provided with three arms 40, 41, 42. The arm 40 is provided with the cam surface 43 and with the straight surface 44 which cooperates with blade 12 of lower switch No. 4.

The arm 41 is provided with a locking finger 45 which cooperates with blade 12 of lower switch No. 4, and the arm 42 is provided with a locking finger 46 which cooperates with blade 12 of lower switch No. 2. The finger 46 is provided with a cam surface 80.

The bar 23 is movable with the bars 21, 22 and also independently thereof, as will be described. The closed position of the blades 10, 12 is indicated in Figs. 15 to 20 by full lines, and the open position of said blades is indicated by dotted lines. When the upper switches Nos. 2, 3 and 4 are in their closed position and the corresponding lower switches are in their open position, the bar 23 is in the position shown in Figs. 5, 6, 14 and 15 with relation to blade 12 of lower switch No. 4, that is, with the locking finger 45 in the path of blade 12 of lower No. 4 switch.

The bar 23 is moved one step with the bars 21, 22, when the upper No. 2 switch is opened, from the position shown in Fig. 15 into that shown in Fig. 16, and its locking finger 45 is removed from the path of blade 12 of lower No. 4 switch.

When upper No. 3 switch is opened, bar 23 is moved a second step from the position shown in Fig. 16 into that shown in Fig. 17, in which latter position, the locking finger 46 on arm 42 is extended over the blade 12 of lower No. 2 switch and the latter is locked in its closed position, and the finger 45 is still further removed from the path of blade 12 of lower No. 4 switch.

Figures 19, 20:
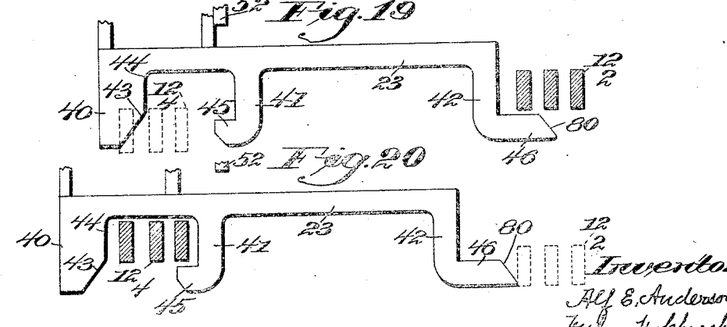

When upper No. 4 switch is opened, the bar 23 starts to move with the bars 21, 22, and advances from the position shown in Fig. 17 into that shown in Fig. 19, but is then moved in the reverse direction independently of the bars 21, 22 from the position shown in Fig. 19 into the position represented in Fig. 18, by the blade 12 of lower No. 4 switch engaging the cam surface 43 on the arm 40, and when the blade 12 of lower No. 4 switch is closed, the locking finger 46 unlocks the blade 12 of lower No. 2 switch and the straight surface 44 of the arm 40 is held up against the blade 12 of lower No. 4 switch, as shown in Fig. 18.

Figures 5, 6, 7:
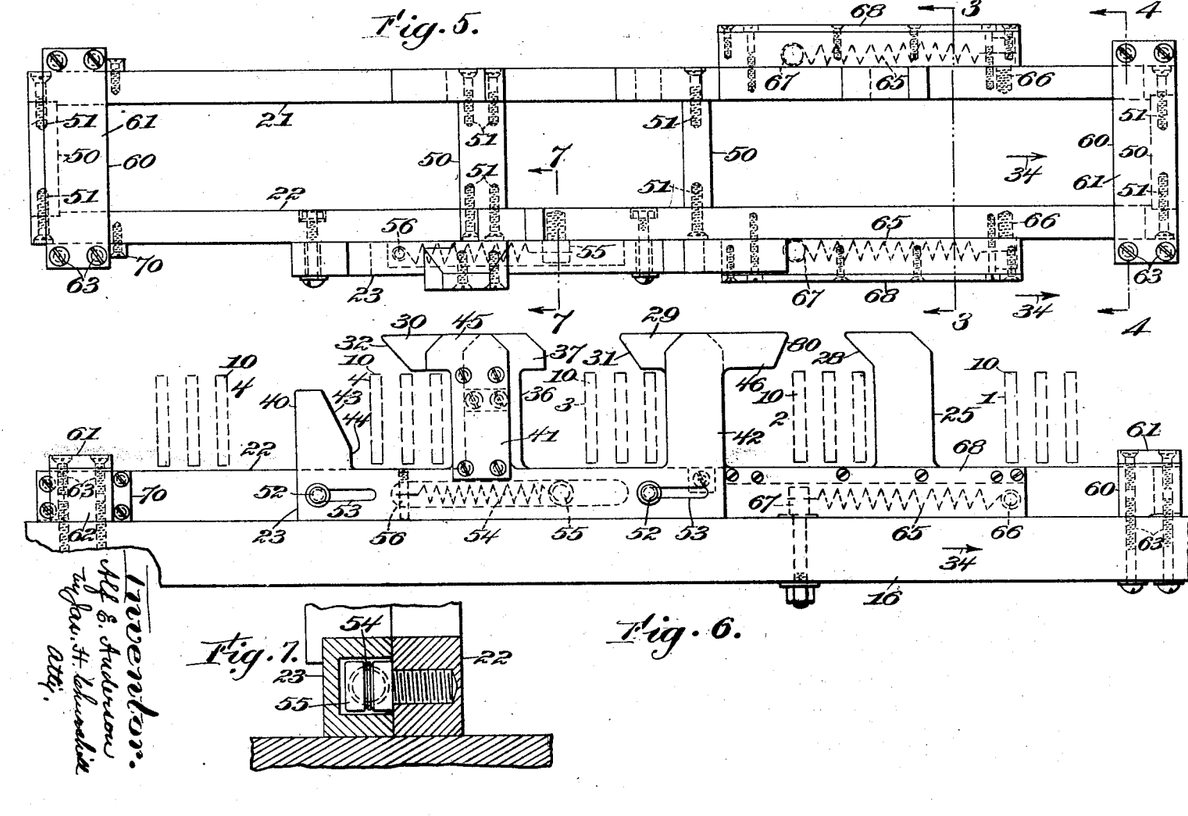
Fig. 5, a front elevation of the control mechanism shown in Fig. 1 by itself.
Fig. 6, a plan view of the control mechanism shown in Fig. 5, with the switch blades shown by dotted lines.
Fig. 7, a section on the line 7—7, Fig. 5.
Figure 8:
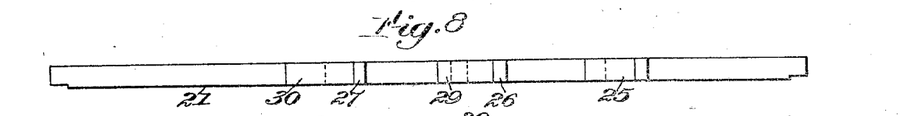
Figs. 8 to 13, details of the individual locking members shown in Fig. 1.
Figure 9:
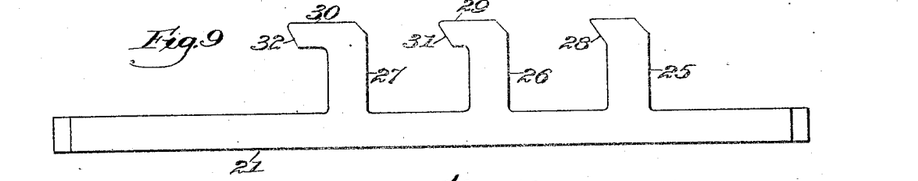
Figure 10:
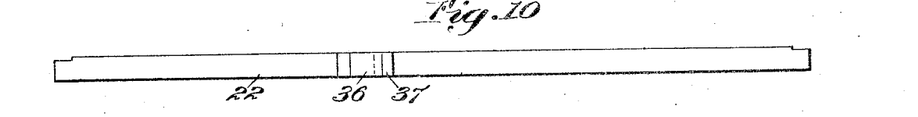
Figure 11:
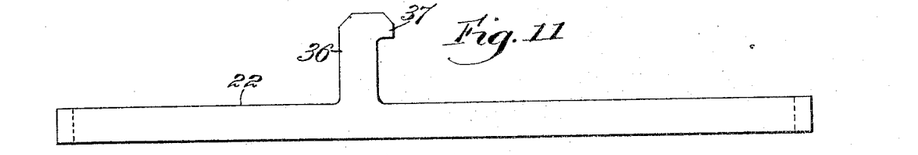
Figure 12:
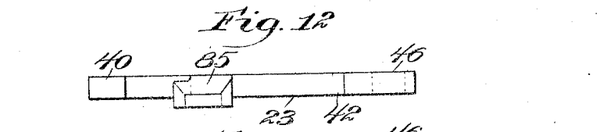
Figure 13:
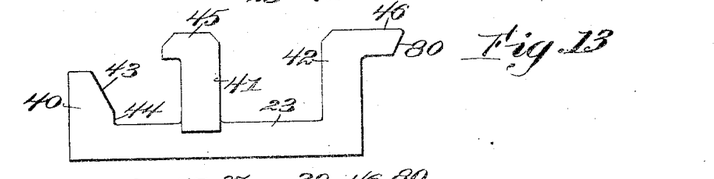
Figure 14:
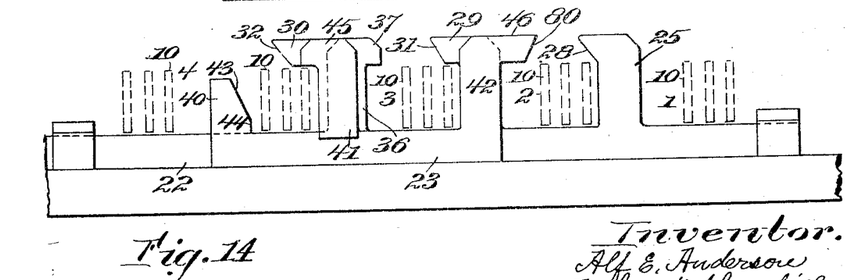
Figs. 14 to 20, schematic views to illustrate the action of the individual members of the control mechanism shown in Fig. 1.

The bars 21, 22 are separated the proper distance to permit the bar 21 to cooperate with the blades 10 of upper Nos. 2, 3 and 4 switches, and the bar 22 to cooperate with the blade 12 of lower No. 3 switch, which is effected by cross bars 50, see Fig. 5, which are secured to the bars 21, 22 by screws 51 or otherwise.

The bar 23 is secured to the bar 22 by screws 52 which extend through slots 53 in the bar 23 at its opposite ends, and the bar 23 is acted upon by a spring 54 which has one end attached to a stud 55, screwed into the bar 22, and has its other end attached to a pin 56 secured to the bar 23. The spring 54 normally holds the rear end walls of the slots 53 against the screws 52 so that the bar 23 will move in one direction indicated by the arrow 34 with the bars 21, 22 as one piece.

The spring 54 also permits the bar 23 to be moved in the reverse direction independently of the bars 21, 22, when the blade 12 of lower No. 4 switch acts on the cam surface 43 of the arm 40 in the closing movement of said blade, and moves the bar 23 from the position shown in Fig. 19 to that shown in Fig. 18. The spring 54 also serves to keep the straight face 44 of the arm 40 up against the blade 12 of lower No. 4 switch.

The bars 21, 22 are mounted upon the panel or board 16 to slide thereon in suitable guides 60, shown separately in Fig. 4 and comprising a cross bar 61 and end bars 62 which are secured together and to the board or panel 16 by screws 63. The bars 21, 22 are moved in one direction, indicated by the arrow 34, by the blades 10 of the upper Nos. 2, 3 and 4 switches and in the reverse direction by springs 65 located outside of the bars 21, 22 within suitable housings, and having one end connected with the bars 21, 22 by screw studs 66 and having their other end connected with studs 67 secured to the panel or board 16, as shown in Figs. 5 and 6. The housings in which the springs 65 are located are formed by removable cover plates 68 cooperating with the bars 21, 22 and the panel or board 16.

The movement of the bars 21, 22 by the springs 65 is limited by projections or stops 70 attached to their rear ends, which normally abut against the rear guides 60, see Figs. 1, 5 and 6.

The locking bars 21, 22, 23 are arranged in the present instance and as shown in Fig. 1, so that with the upper switches 1, 2, 3 and 4 closed, and lower switches 1, 2, 3 and 4 opened, the bars 21, 22, 23 are under the influence of the springs 65 and are in their extreme left hand position with the stops 70 abutting against the stationary rear guide 60.

With the locking bars in the positions shown in Figs. 1 and 6, upper No. 4 switch is locked by the finger 30 on bar 21, upper No. 3 switch is locked by the finger 29 on bar 21, and upper No. 2 switch is unlocked from the bar 21.

Upper No. 2 switch while unlocked from the bar 21 is practically locked by the arm 20 of upper No. 1 switch, which in the arrangement of switches herein shown must be first opened, before upper No. 2 switch can be opened.

We will therefore assume that upper No. 1 switch is open and lower No. 1 switch is closed. Under these conditions the bars 21, 22, 23 are in the positions indicated in Figs. 1, 14 and 15. The operator can open upper No. 2 switch and close lower No. 2 switch. In opening upper No. 2 switch, the bar 21 is moved one step toward the right as indicated by the arrow 34, by the blade 10 of said switch acting on the cam surface 28 of the arm 25 on bar 21. This movement of the bar 21 unlocks upper No. 3 switch and leaves upper No. 4 still locked, as represented in Fig. 16. At the same time bar 21 is moved one step, the bars 22, 23 are also moved one step in the same direction, and occupy the position shown in Fig. 16. The bars 21, 22, 23 are held in this position against the action of the springs 65, by the blade 10 of upper No. 2 switch, which in its open position represented in Fig. 16 is engaged by arm 25 and acts as a stop to prevent backward movement of the bar 21 by the springs 65. The operator can now open upper No. 3 switch, the blade 10 of which acts on the cam surface 31 of the locking finger 29 and effects movement of the bars 21, 22, 23 a second step in the direction of the arrow 34 and into the position shown in Fig. 17. The bars 21, 22, 23 are held in this position by the finger 29 on bar 21 bearing against the blade 10 of upper No. 3 switch in the open position of the latter.

Opening of upper No. 3 switch closes lower No. 3 switch, unlocks upper No. 4 switch, as represented in Fig. 17, and locks lower No. 2 switch by the finger 46 on bar 23, as represented in Fig. 17. The operator can now open upper No. 4 switch, which moves the bars 21, 22, 23 a third step in the direction of arrow 34 and locks lower No. 3 switch by the finger 37 on bar 22, see Fig. 18, and holds it locked by the blade 10 of upper No. 4 switch engaging the finger 30 on bar 21, as represented in Fig. 18, and keeps lower No. 2 switch locked. The bar 23 on the opening of upper No. 4 switch has the cam surface 43 on its arm 40 brought into the path of the blade 12 of lower No. 4 switch, as shown in Fig. 19, so that as said blade 12 is moved into its closed position, it engages the cam surface 43 and moves the bar 23 backward or in the direction opposite to that indicated by arrow 34 until the blade 12 is closed and engages the straight face 44 at the lower end of the cam surface 43, see Fig. 18. This backward movement of the bar 23 unlocks lower No. 2 switch and leaves lower No. 4 switch unlocked, and the bar 23 is held in this position by its spring 54. The bars 21, 22 are prevented from being moved backward under the influence of the springs 65, by the blade 10 of upper No. 4 switch in its open position, represented in Fig. 18.

At this stage, all of the upper switches are open and all of the lower switches are closed, see Fig. 18. Of the lower switches, lower No. 3 is locked and lower Nos. 2 and 4 are unlocked, which gives the operator a selection, in that he can operate either No. 4 or No. 2. It also permits him to close the upper switches and open the lower switches in sequence in the reverse order to that in which they are closed. If the operator desires, he can open lower No. 4 and close upper No. 4, and by so doing, the blade 10 of upper No. 4 is removed from engagement with the finger 30 on bar 21, which permits the spring 65 to move all of the bars 21, 22, 23 one step in the reverse direction from the position shown in Fig. 18 to that shown in Fig. 17 and unlocks lower No. 3 switch, and brings the finger 29 on the bar 21 against the blade 10 of upper No. 3 as represented in Fig. 17. Upper No. 3 switch is next closed, which allows the bar 21 to be moved into the position shown in Fig 16, wherein upper No. 4 is locked and upper No. 3 is closed but unlocked, and upper No. 2 is engaged by the arm 25, which prevents movement of the bar 21 by the springs 65. Upper No. 2 switch is next closed, which allows the springs 65 to move the bar 21 into the position shown in Fig. 15, which is the starting position with all the upper switches closed.

It will thus be seen, that the arrangement of the locking bars 21, 22, 23 is such that the upper switches Nos. 2, 3 and 4 may be opened and their corresponding lower switches may be closed in sequence and that the lower switches may be opened and the upper switches closed in sequence in the reverse order.

In many electrical situations, it is highly desirable that when all the upper switches of the series Nos. 2, 3 and 4 are closed, a selected one should alone be capable of being opened, and that the others should be locked, thereby requiring the operator to open the series in predetermined order, which in the present instance is in the order 2, 3 and 4.

It is also desirable that the upper switches Nos. 2, 3 and 4 should be closed in sequence in the reverse order. It is further desirable that when the upper switches are all open and the lower switches closed, that a selected one of the series should be free to be manipulated at the will of the operator, and that when the selected switch is operated the others of the series should be locked in their closed position and thereby be incapable of being opened, except by first bringing the selected switch back into its closed position to establish the relation of the locking devices which will permit the series of closed switches to be opened in sequence.

It has been pointed out that in the present instance when the upper switches Nos. 2, 3 and 4 have been opened, and the lower switches closed, that the lower Nos. 4 and 2 switches were capable of being opened by the operator.

Assume that the operator desires to open lower No. 2 and close upper No. 2. In this case, when the blade 12 of lower No. 2 is moved into its open position from its closed position represented in Fig. 18, it acts on the cam surface 80 of the locking finger 46 on bar 23 and moves the latter in the direction opposite to that indicated by the arrow 34 into the position represented in Fig. 20 and moves the locking finger 45 on said bar over the blade 12 of lower No. 4 switch to lock the same, in which position the bar 23 is held against the action of its spring 54 by the blade 12 of lower No. 2 switch bearing against the end of the locking finger 46 on the bar 23.

It will thus be seen that when lower switch No. 2 is opened, lower No. 4 and lower No. 3 switches are locked in their closed position. The operator can again close lower No. 2, in which case the spring 54 moves the bar 23 in the direction of the arrow 34 into the position represented in Fig. 18, and unlocks lower No. 4. The operator can open and close lower No. 2 as often as he likes, but if he should desire to open lower No. 4 and No. 3, he is obliged to return lower No. 2 into its closed position, and then open the lower switches in their proper sequence, to wit, 4, 3 and 2.

When lower No. 2 has been closed, the bar 23 is moved by its spring 54 into the position shown in Fig. 18 with the straight face 44 of the arm 40 abutting against the blade 12 of lower No. 4 switch in its closed position. Lower No. 4 can now be opened, and on its opening movement, the bar 23 is moved by its spring 54 so as to lock lower No. 2 before lower No. 4 is fully opened, as represented in Fig. 17. Lower Nos. 3 and 2 are now locked. When lower No. 4 is fully opened and upper No. 4 is fully closed, the springs 65 move the bars 21, 22, 23 and bring the locking finger 30 on bar 21 over the blade 10 of upper No. 4 into position to lock upper No. 4 when lower No. 3 is opened. When lower No. 3 is opened, upper No. 3 is closed and ready to be locked by the finger 29 when lower No. 2 is opened, and as soon as upper No. 2 is closed, the springs 65 move the bar 21 into the position shown in Fig. 15.

In opening the series of lower switches in the reverse order, to wit, Nos. 4, 3 and 2, the blade 12 of lower No. 4 switch in its open position would be located in the path of movement of the locking finger 45 on bar 23 for lower No. 4 switch and said finger would abut against lower No. 4 blade, if the finger was made of uniform thickness. To prevent this, the locking finger 45 on bar 23 is constructed so that it can slide under blade 12 of lower No. 4 switch when the latter is open, and in the present instance, said finger is provided with a beveled rear surface 85, see Fig. 12.

By providing for movement of the finger 45 under the blade 12 of lower No. 4 in the open position of the latter, the bar 23 is permitted to move with bars 21, 22 and the lower No. 2 switch is allowed to be opened.

In the present instance, one arrangement of locking devices for a series of switches is shown, but it is not desired to limit the invention to the particular construction or arrangement shown, nor to the number of switches included in the series.

Furthermore, the locking devices are herein shown as so related, that the switches must be opened in the order 2, 3 and 4 and closed in the reverse order, but it is not desired to limit the invention in this respect, as they may be so arranged as to require the switches to be opened in a different order but in sequence. So also the invention is shown as embodied in one form of switch having an upper and lower blade, but it is not desired to limit the invention to the particular form of switch.

Claims.

1. The combination with a plurality of switches, comprising upper and lower switches, of a locking member comprising a bar provided with a plurality of locking fingers for engagement with the movable blades of a plurality of said upper switches and having cam surfaces cooperating with said blades to effect movement of said bar by said blades, and having an arm provided with a cam surface cooperating with the movable blade of another of said upper switches, and a plurality of locking members for the movable blades of said lower switches, one of said latter locking members comprising a second bar provided with a locking finger for engagement with the movable blade of one of said lower switches, and the other of said latter locking members comprising a third bar provided with a plurality of locking fingers for engagement with the movable blades of a plurality of said lower switches, and having an arm provided with a cam surface to be engaged by the movable blade of one of said lower switches, one of said locking fingers of said third bar having a cam surface, means for connecting the second bar with the first bar to move as one piece, means for connecting the third bar with said second bar to move therewith and also independently thereof, and means for moving said bars in the reverse direction to that in which they are moved by the blades of said switches acting on the cam surfaces on said bars.

2. The combination with a plurality of switches, comprising upper and lower switches, of a locking member cooperating with the upper switches, and a plurality of locking members cooperating with the lower switches, said locking members being constructed and arranged to require the upper switches to be opened and the lower switches to be closed in predetermined order, and the lower switches to be opened in the reverse order to that in which they are closed, while permitting a selected switch of the series to be opened and closed at the will of the operator.

3. The combination with a plurality of switches, of a locking member cooperating with the movable blades of a plurality of the said switches to lock the same in their closed position and cooperating with the movable blade of another of said switches to permit the latter blade to be moved into its open position to actuate said locking member to unlock one of the locked switches.

4. The combination with a plurality of switches, of a locking member cooperating with the movable blades of a plurality of the said switches to lock the same in their closed position and cooperating with the movable blade of another of said switches to permit the latter blade to be moved into its open position to actuate said locking member and unlock one of the locked switches, and a locking member movable with the first mentioned locking member and cooperating with the movable blade of another switch to lock and unlock the latter.

5. The combination with a plurality of switches, of a locking member for one of said switches constructed and arranged to be actuated by another of said switches and to be moved in one direction into position to unlock the first-mentioned switch and permit it to be moved with the second-mentioned switch in the position into which it has been moved, and means for automatically moving said locking member in the opposite direction and into locking position.

6. The combination with a plurality of switches, of a locking member provided with locking fingers of unequal length cooperating with the movable blades of two of said switches and actuated by the movable blade of a third switch of said series to unlock one of the previously locked switches and to leave the other of said switches locked, and means on the locking finger of the second switch for unlocking the third switch by the blade of the second switch of said series.

7. The combination with a plurality of switches, of a locking member cooperating with the blade of one of said switches to lock and unlock the same, and a second locking member connected with the first mentioned locking member to move therewith and also independently thereof and cooperating with the blades of other switches than that with which the first mentioned locking member cooperates, to lock and unlock the blades of said other switches.

8. The combination with a plurality of switches, comprising upper and lower switches, of a locking member cooperating with the blade of an upper switch, and a locking member cooperating with the blade of a lower switch and actuated by movement of the blade of an upper switch.

9. The combination with a plurality of switches, of a locking member common to two of said switches and bodily movable with respect thereto and provided with devices co-operating with the blades of said switches to lock either of said switches in one condition when the other of said switches is in another condition, and means for moving said locking member and said devices into a position wherein both locking devices are inoperative to prevent movement of either switch and wherein one of said locking devices is in position to be actuated by the blade of one of said switches to effect movement of the locking member and bring the other locking device into locking relation to the blade of the other of said switches.

10. The combination with a plurality of switches, comprising upper and lower switches having upper and lower blades movable as one piece, a locking member co-operating with the upper blades to lock a plurality of said blades in their closed position and to leave the blade of another of said upper switches free to be opened, additional locking members cooperating with the blades of the lower switches to lock the blade of one of said lower switches in its closed position when all of the lower switches are closed and to leave the blade of another of said lower switches in its closed position unlocked and free to be opened.

11. The combination with a plurality of switches, of a plurality of locking means co-operating with the blades thereof and constructed and arranged to be bodily movable simultaneously by the said blades transversely with relation to the latter only when the said blades are opened in predetermined order.

12. The combination with a plurality of upper and lower switches having upper and lower blades, of a locking member cooperating with the upper blades to lock one and leave another unlocked in their closed position, and a locking member cooperating with the lower blade of the unlocked switch to lock the said lower blade in its closed position.

13. The combination with a plurality of switches comprising upper and lower switches, of a plurality of locking bars co-operating with the blades of said switches and movable transversely with relation thereto, one of said locking bars cooperating with the blades of the upper switches to lock a plurality of them in their closed position and to leave the blade of one of said switches unlocked, another of said locking bars co-operating with the lower blade of one of the locked switches to lock said lower blade in its closed position, and another of said locking bars cooperating with the lower blade of the other locked switch and with the lower blade of the unlocked switch to lock the same under conditions of use and to leave one locked when the other is open.

14. The combination with a plurality of switches, of a locking member co-operating with the movable blades of a plurality of switches to lock the same in their closed position and co-operating with the movable blade of another switch of said series to unlock the latter switch, said locking member being movable step by step in one direction to unlock the locked switches by movement of the blades in predetermined sequence, and means for automatically moving the locking member in the opposite direction step by step to again lock some of the switches and leave another unlocked when the blades are moved into their closed position in predetermined sequence in the reverse order to that in which they are opened.

15. The combination with a plurality of switches, of a locking member co-operating with the movable blades of a plurality of said switches to lock one of the same in one position and to permit the blade of another of said switches to be moved into a different position and actuate said locking member to unlock said locked switch and place said locking member into position to be actuated by the unlocked switch independently of the first-mentioned switch.

16. The combination with a plurality of switches, of a locking member for one of said switches constructed and arranged to be actuated by another of said switches, means for automatically moving said locking member into locking position, said locking member cooperating with the switch by which it is actuated to prevent it being moved into locking position by said means.

In testimony whereof, I have signed my name to this specification.

ALF E. ANDERSON.